United States Patent [19]

Hurst

[11] 4,049,102

[45] Sept. 20, 1977

[54] CLUTCH SHIFTING MECHANISM

[75] Inventor: John W. Hurst, Port Huron, Mich.

[73] Assignee: Chrysler Corporation, Highland Park, Mich.

[21] Appl. No.: 706,365

[22] Filed: July 19, 1976

[51] Int. Cl.² .................. F16D 21/04; F16D 23/12
[52] U.S. Cl. ............................. 192/93 R; 192/51; 74/567
[58] Field of Search .............. 192/93 R, 21, 51, 48.91

[56] References Cited

U.S. PATENT DOCUMENTS

| 2,093,357 | 9/1937 | Harper | 192/21 |
| 3,178,955 | 4/1965 | Enders et al. | 192/93 R |

Primary Examiner—Benjamin W. Wyche
Attorney, Agent, or Firm—Talburtt & Baldwin

[57] ABSTRACT

The invention relates to shift control mechanisms for clutches in which a cam and follower are used to control shifting of the clutch.

10 Claims, 7 Drawing Figures

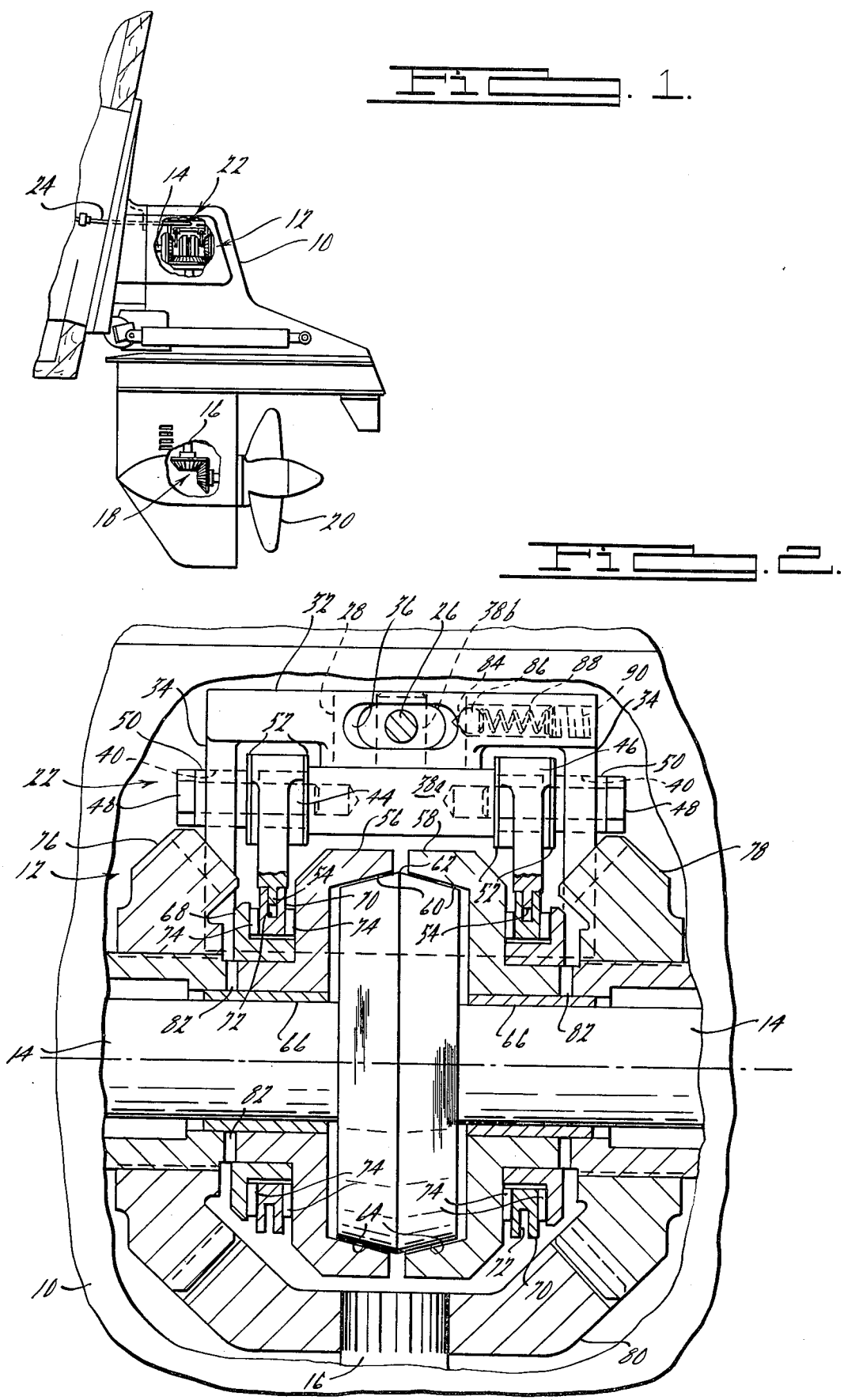

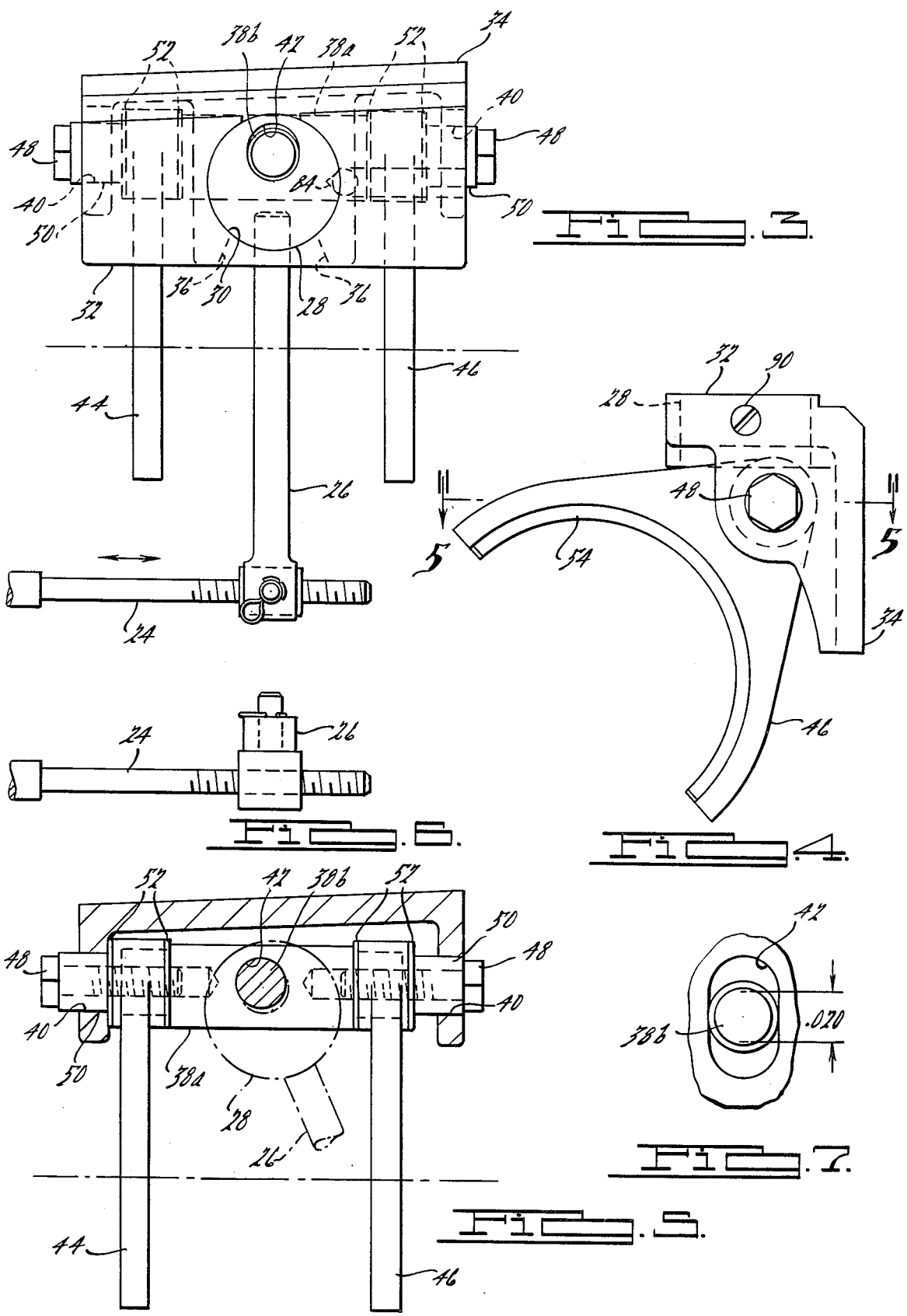

CLUTCH SHIFTING MECHANISM

BACKGROUND OF THE INVENTION

Although of general application, this invention is most particularly concerned with clutches for boat drives such as the inboard-outboard type in which an outboard drive unit is driven by an inboard engine. The invention is so described herein.

Such marine drive units have made use of various types of dog and friction clutches. Friction clutches of the cone type are popular and are shown in U.S. Pat. Nos. 3,212,349; 3,269,497; 3,915,270 and in application Ser. No. 598,313 now U.S. Pat. No. 3,977,503.

The clutches normally include input and output shafts, one of which carries a pair of spaced forward and reverse gears and a clutching mechanism for selectively engaging one or the other of the gears. The other shaft carries a gear coupled with both of the gears on the first shaft. The clutching mechanism is ordinarily axially movable between the paired forward and reverse gears for establishing the desired clutching engagement.

Such reversing clutches require a shifting control mechanism capable of effecting clutching engagement with little effort since remote operation of the clutch through a cable system is typically used. Also, the axial displacement ordinarily required of the clutching mechanism is relatively slight and the shifting mechanism must be capable of accurately controlling small movements.

It is the general purpose of this invention to provide such an arrangement.

SUMMARY OF THE INVENTION

In this invention, a pair of rotatable clutch members are disposed spacedly on a shaft and are axially movable thereon to positions of engagement and non-engagement with other clutch members in a clutch mechanism. The spaced members are coupled together so that any axial movement is mutual. The arrangement includes a cam and follower for reciprocably moving the members in and out of their various axial positions on the shaft. Rotation of the cam is translated by the follower into linear reciprocable movement for axially moving the members. The arrangement provides accurate control over movement and provides mechanical advantage.

BRIEF DESCRIPTION OF THE DRAWINGS

FIG. 1 shows a clutch in a marine outboard drive unit;

FIG. 2 is an enlarged view of the clutch mechanism of FIG. 1 partly in cross-section showing various parts in detail;

FIG. 3 is a fragmentary plan view of the shifting control mechanism which is located at the top of the clutch in FIG. 2;

FIG. 4 is an end view of FIG. 3;

FIG. 5 is a view similar to FIG. 3 showing the clutch in a shifted position where in FIGS. 1 - 4 the clutch is in neutral;

FIG. 6 is a top elevational view of the cable connection shown in FIG. 3, and

FIG. 7 is an exaggerated schematic showing of the camming surfaces involved in the invention.

DESCRIPTION OF THE PREFERRED EMBODIMENT

As seen in FIGS. 1 and 2, the preferred embodiment of the invention includes an outboard housing 10 having in its upper portion a clutch mechanism which includes rotating gears and other rotating clutch members, generally indicated at 12, carried on a rotatable shaft 14 extending from an inboard mounted engine (not shown) for driving the unit. The driving torque applied to shaft 14 is transferred by clutch mechanism 12 to another rotatable shaft 16 which is adapted as at 18 to drive a propeller 20, as is well known in the art, to provide forward and reverse drives and a neutral condition.

At the top of the clutch 12 is a shift control mechanism generally indicated at 22, for shifting the clutch between the "forward", "neutral" and "reverse" conditions. Actuation of shift control 22 is by means of a remotely operated cable 24 which is connected to push and pull lever 26 as indicated by the arrow in FIG. 3.

Lever 26 extends into shift control 22 and is connected to rotate a cam 28. Cam 28 is a circular body carried and fitted for rotation in a correspondingly shaped circular opening 30 in a mount 32 which preferably forms the top of a support bracket 34 as best seen in FIGS. 3, 4 and 5. Mount 32 includes a second opening 36 through which lever 26 extends to connect with cam 28. Opening 36 is shaped, such as being elongated, to allow for circumferential movement of lever 26 when rotating cam 28 in opening 30.

Bracket 34 reciprocably supports a cam follower 38 which includes an elongated body portion 38a and an upwardly extending post portion 38b. Body portion 38a is supported near its ends in bracket 34 by openings 40 therein through which body portions 38a may move reciprocably as is illustrated in FIGS. 3 and 5.

Cam follower portion 38b extends upwardly from body portion 38a to contact cam 28. However, post 38b contacts cam 28 eccentrically, i.e., at a point different than the center of rotation of the cam, so that rotation of cam 28 causes cam follower 38 to move linearly through openings 40 in support 34. Specifically, post 38b extends through an opening 42 in cam 28, opening 42 being off center of cam 28 and slightly behind the centerline of the clutch mechanism and shaft 14 as shown in FIGS. 3 and 5. Preferably, opening 42 is slightly oblong with the major axis thereof being substantially perpendicular to the reciprocating direction of cam follower movement since this has been found to provide linear movement in cam follower 38 which most accurately controls the clutch shifting mechanism.

By oblong is meant an opening in which post 38b fits with movement allowed only in the direction of the major axis of the opening and substantially no movement being allowed in the direction of the minor axis. Such an oblong opening is shown in FIGS. 3 and 5 and in detail in FIG. 3 which shows post 38b of a certain diameter, e.g., 7/16 inch in an oblong opening formed by the halves of two 7/16 circles the centers of which are spaced 0.020 inches apart and joined by straight edges. It can be seen that post 38b cannot substantially move sideways in such an arrangement, i.e., along the minor axis of the opening but it can move longitudinally in the opening, i.e., along the major axis.

Mount 32 positions cam 28 for bidirectional rotation in a plane spaced from shaft 14 and substantially parallel thereto as is shown in FIGS. 2-5.

Bracket 34 positions cam follower 38 between shaft 14 and cam 28 with follower post 38b extending toward cam 28 and eccentrically located relative to the center thereof so as to provide the linearly reciprocal movement of follower 38 upon the selective rotation of cam 28 in either rotary direction by lever means 28. The arcuate motion described by opening 42 of cam 28 upon rotation urges post 38b in directions linearly parallel to shaft 14. Bracket support 34 also positions follower 38 for linear movement in a plane substantially parallel to the shaft 14.

To drive propeller 20 a certain engaging force is required to actuate the clutch. To disengage the clutch the engaging force must be overcome. With a remote control lever (not shown, but usually located in the driver's position aboard the boat), which ordinarily has about 12 inches of travel, travel of the unit shift lever 26 of about 2 inches is usually provided. The clutch mechanism proper may preferably have a travel of only about 0.12 inches. Such an arrangement will typically provide a preferred mechanical advantage overall of about 80:1 for the entire system and will require provisions for a mechanical advantage of about 20:1 in the unit shift mechanism per se. This requires a shift mechanism which accurately moves the cable over its slight travel upon movement of lever 26 over its travel.

The cam arrangement of the invention provides for such a slight linear movement of the cam follower that the center of the eccentrically located post 38b is located so close to the center of circular cam 28 that the cam cannot be mounted by attachment to its center as there is not enough room to allow for a post 38b of such size as to provide the strength required in the structure. Thus cam 28 is carried for rotation on its outer circumferential surface allowing room on the cam near its center point for contact with post 38b. Additionally such a mounting arrangement provides additional support and additional bearing surface for cam 28.

Space shift rings or forks 44 and 46 are attached to cam follower 38 by means of bolts 48, sleeves 50 and washers or spacers 52 such that the shift rings or forks are axially displaced or move with follower 38 relative to shaft 14 when the shift control causes cam follower 38 to move. Both shift rings are fork-like in shape and include an inner arcuate tongue or key-like portion 54 by means of which the shift control is connected to the clutch proper in receiving or mating grooves on the rotatable clutch members as described below.

The clutch shown is of the type described in application Ser. No. 598,313 aforementioned and more fully described therein. The clutch includes a pair of female cone members 56 and 58 spacedly disposed and rotatable on shaft 14 and having opposing concave frustoconical faces 60. The female cone members are axially movable on shaft 14 over a range of travel toward and away from a third clutch member 62 which comprises a male cone member having opposed frusto-conical convex surfaces 64 for respectively and selectively engaging conical surfaces 60 on the female members. Female cone members 56 and 58 may be carried on shaft 14 by means of bushings 66 which provide for stability of these parts on the shaft.

Each female cone member includes an annular member 68 fitted to the female cones for rotation and axial movement therewith. Each member 68 carries a ring 70 having an annular groove 72. Rings 70 are positioned between annularly distributed sets of needle bearings indicated at 74 which facilitate rotation of rings 70 relative to their corresponding female cone member. As can be seen, the tongues 54 of shift rings 44 and 46 are received by grooves 72 of rings 70 on each female cone member 56 and 58, respectively. Thus, shifting of the female cone members may be accomplished as they are both simultaneously axially moved along shaft 14 when the control mechanism is operated whereby either may selectively engage the male cone member or both may be positioned away from it in a neutral condition.

Rotation of shaft 16 is provided by interaction of three gears. Two of the gears 76 and 78 are carried on shaft 14 while the third gear 80 is placed on shaft 16 between the first two gears so as to constantly intermesh with them. Gears 76 and 78 are axially fixed on shaft 14 but freely rotatable thereon whereby rotation of either gear 76 or 78 causes rotation of gear 80 and hence rotation of shaft 16 to which gear 80 is fixed.

Gears 76 and 78 are driven by their respective female cone members to which they are adjacent. Interconnection for coaction between the female cone members and their adjacent gear may be constantly provided by means of radially distributed sets of overlapping helical surfaces indicated at 82 and described more fully in the aforenoted application Ser. No. 598,313. For present purposes it is only necessary to understand that the helical surfaces provide for driving connection between the female cones and respective gears while allowing axial movement of the female cones on shaft 14 relative to the gears so that the cones may drive the gears when engaged with the male cone member or idle when not. Since the gears 76 and 78 rotate in opposite directions when each is driven by male cone 62 through the female cones and overlapping helical surfaces extending between the gears and female cones, forward and reverse rotary movement is obtained from shaft 16.

It has been found desirable to include at least one detent 84 on cam 28 whereby a plunger such as ball 86 and a spring 88, held by a screw 90 as in mount 32, may be used to positively position and to indicate by feel the position and condition of the clutch e.g., "neutral" as shown. Additional detents may be included for other positions corresponding to forward and reverse if desired.

Other arrangements of the clutch mechanism may make use of the shifting control provided by this invention. For example, the clutch members may be arranged vertically on shaft 16 and the intermeshing gear 80 may be placed on shaft 14 to function as an input gear to the clutch to drive gears 76 and 78 on shaft 16. In such an arrangement the cam follower would reciprocate vertically to control the clutch.

What is claimed is:

1. In a reversing clutch mechanism wherein two rotatable members are disposed spacedly on a shaft and are axially movable on the shaft to positions of engagement and non-engagement with the clutch mechanism, means coupling the two members together for joint axial movement on the shaft and including
   a cam,
   means mounting the cam for bidirectional rotation in a plane spaced from the shaft and substantially parallel thereto,
   means for selectively rotating the cam in either rotary direction,
   a cam follower positioned between the shaft and the cam and including a portion which extends toward the cam and is located eccentrically relative to the center of rotation of the cam, means mounting the cam follower for reciprocating linear movement in a plane substantially parallel to the shaft, means connecting the cam follower portion eccentrically to the cam whereby partial rotation of the cam in either rotary direction causes the cam follower to move parallel to the shaft in a corresponding linear direction, and means connecting the two members to the cam follower.

2. The reversing clutch mechanism according to claim 1 in which the cam is circular in shape and is fitted into a mating circular opening in the cam mounting means for rotation therein on the cam's circumferential surface.

3. The reversing clutch mechanism according to claim 1 in which the connection between the cam and cam follower portion is by means of an opening in the cam into which at least a part of the cam follower portion fits.

4. The reversing clutch mechanism according to claim 3 in which the opening in the cam is oblong, the major axis being substantially perpendicular to the reciprocating direction of the cam follower.

5. The reversing clutch mechanism according to claim 1 in which the cam follower comprises a first part which is substantially parallel to the shaft and mounted for reciprocation and a second part which extends therefrom toward the cam.

6. The reversing clutch mechanism according to claim 1 including a spring biased plunger and detent cooperating with the cam for positioning it.

7. The reversing clutch mechanism according to claim 1 in which the means connecting the two members to the cam follower comprise a pair of shift forks each of which respectively partially encircles one of the two members circumferentially, connection therebetween being by means of a mated coacting groove and tongue arrangement.

8. In a reversing clutch mechanism wherein two rotatable members are disposed spacedly on a shaft and a third rotatable member is disposed on the shaft between the first two members, and the first two members are selectively movable along the shaft to respective positions in engagement with the third member for rotation therewith and into a neutral position out of engagement with the third member; means for positioning the two members comprising:

a cam follower having a body and a projecting post;

first support means supporting the cam follower for reciprocating movement parallel to the positioning movement of the two rotatable members on the shaft and with the post projecting away therefrom;

means connecting the cam follower body to both of the two members whereby reciprocating movement of the cam follower selectively moves the two members jointly along the shaft into and out of their respective positions;

second support means fixedly positioned above the first support means and having a circular opening, normally and eccentrically located relative to the cam follower post;

a circular cam body fitted into the opening for rotation therein;

means connecting the cam body and the cam follower post together and operative upon rotation of the cam body to reciprocably move the cam follower, and control means for rotating the cam body.

9. The reversing clutch mechanism according to claim 8 in which the cam includes an eccentric opening into which the cam follower post extends whereby connection is made therebetween.

10. The reversing clutch mechanism according to claim 9 in which the cam opening is oblong in shape.

* * * * *